S. KELTONIK.
FLY TRAP.
APPLICATION FILED FEB. 23, 1915.
1,191,517.
Patented July 18, 1916.
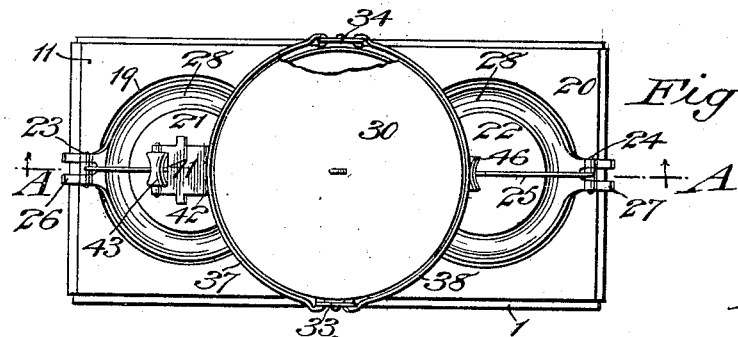
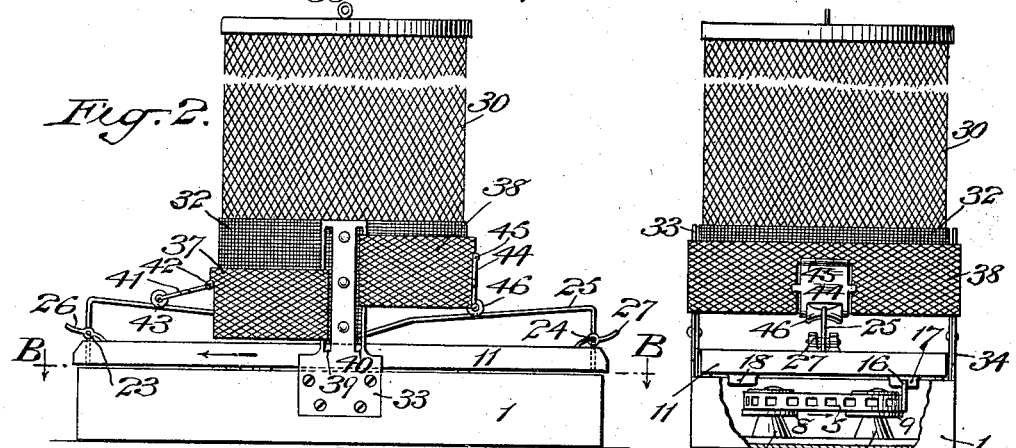
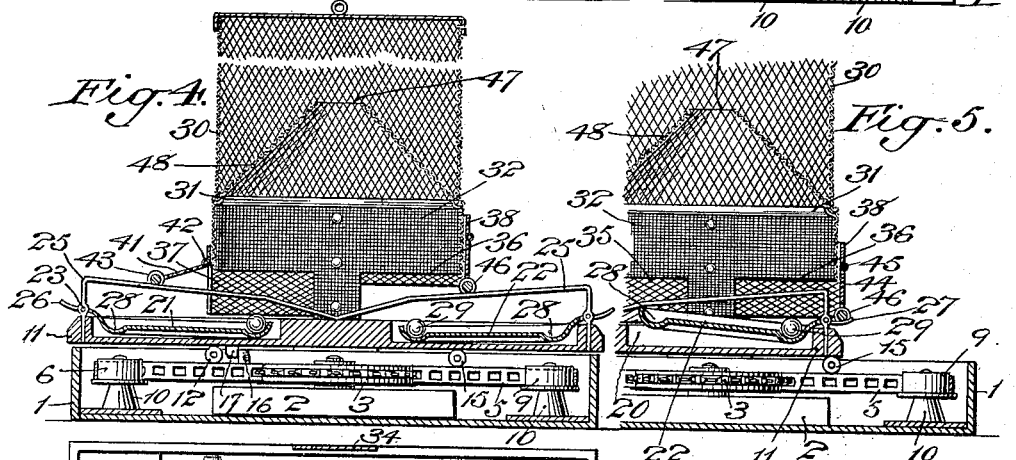
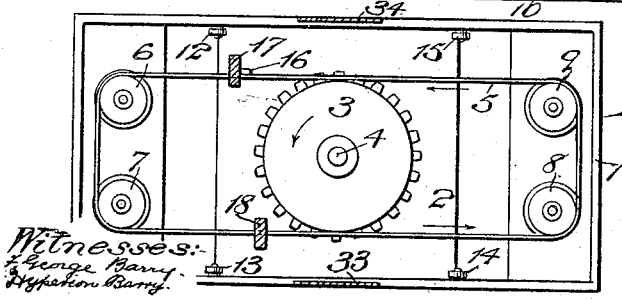
Witnesses:
George Barry
Hyperion Barry
Inventor:
Stephen Keltonik
by attorneys

UNITED STATES PATENT OFFICE.

STEPHEN KELTONIK, OF CONEMAUGH, PENNSYLVANIA.

FLY-TRAP.

1,191,517.

Specification of Letters Patent.

Patented July 18, 1916.

Application filed February 23, 1915. Serial No. 9,960.

*To all whom it may concern:*

Be it known that I, STEPHEN KELTONIK, a citizen of the United States, and resident of Conemaugh, in the county of Cambria and State of Pennsylvania, have invented a new and useful Improvement in Fly-Traps, of which the following is a specification.

This invention relates to an improvement in fly traps, with the object in view of providing a trap which will effectively catch flies or other flying insects by means of a slowly moving platform having suitable bait trays thereon, which platform reciprocates beneath a cage, placing first one tray beneath the cage, then the other. As each tray rests under the cage, a gate is dropped, closing the flies within the space between the platform and the opening into the cage. The dropping of the gate strikes a projection on the tray which causes it to tilt and allow the balls located in a groove around the edge of the tray to roll in this groove and effectually scare or disturb the flies within the housing, thereby causing them to fly upwardly and through the opening in the frusto conical bottom of the cage.

A practical embodiment of my invention is represented in the accompanying drawings, in which, Figure 1 represents a plan view of the trap, a portion of the cage being broken away to show the parts more clearly below, Fig. 2 represents a side elevation of the same, Fig. 3 represents an end elevation of the same, partly broken to show parts within, Fig. 4 represents a central section taken in the plane of the line A—A of Fig. 1, Fig. 5 represents a detail central section showing the parts in the position they assume at the time of delivery of the flies to the cage, and Fig. 6 represents a horizontal section taken in the plane of the line B—B of Fig. 2.

The box forming the base upon which the parts are mounted, is denoted by 1, and has contained therein a motor 2, of any well known or approved form, having a sprocket 3 fixed on the drive shaft 4 of the motor. An endless sprocket chain or belt 5 is engaged by the sprocket wheel 3 and passes around idler pulleys 6, 7, 8 and 9 mounted on standards 10 fixed in the box 1.

A platform 11 is mounted to reciprocate upon rollers 12, 13, 14, 15, mounted in the box 1. This platform 11 is reciprocated by means of an abutment 16 carried by the chain engaging lugs 17, 18, depending from the bottom of the platform and projecting into the path of the abutment 16. The lug 17 is engaged by the abutment 16 to drive the platform in one direction (to the left) and the lug 18 is engaged by the abutment 16 to drive the platform in the opposite direction.

The platform is provided with recesses 19, 20, for the reception of bait trays 21, 22, pivoted at 23, 24, to the cam rail 25 fixed to the platform. The trays have projecting tongues 26, 27, which straddle the cam rail 25 and extend a distance beyond the platform, the purpose of which will be hereinafter described. The trays are also provided with annular channels or grooves 28, in which balls 29 are placed to freely run around the bait placed in the center of the tray.

A cage 30 is removably mounted in a trough 31 fixed to a housing 32 which is supported from the box 1 by means of upright plates 33, 34, to which the housing is riveted. The housing is cut away at 35, 36, to form free passages therethrough and into the cage. These openings are protected by vertically moving gates 37, 38, the ends of which are arranged to slide in slots 39, 40, in the plates 33, 34. The gate 37 is provided with a weighted flap 41 hinged at 42 and provided at the bottom with a roller 43. The gate 38 is also provided with a weighted flap 44 hinged at 45 and provided at the bottom with a roller 46.

The opening and closing movement of the gates is controlled by the cam rail 25 and the platform which reciprocates beneath them. In Figs. 1 to 4 inclusive, the platform, traveling in the direction of the arrow shown on Fig. 2, causes the gate 38 through its flap 44 and roller 46 to travel upwardly due to the inclined portion of the cam rail 25 passing under the roller 46, at the same time the gate 37 is closed and the flap 41 is coming to its closed position due to the inclined portion of the cam rail 25. When the platform has arrived at the limit of its movement in that direction, the highest point of the cam rail will have passed beyond the roller 46, which falls by gravity with the gate 38 to the position shown in Fig. 5. The weight of the gate and flap falling upon the tongue 27, overbalances the weight of the tray 22, which is rocked upon its pivot 24, thereby causing the balls to roll around in their channel toward the pivoted side of the tray. The tilting of the tray to move the balls is intended to disturb the flies or insects within the housing and cause them to fly upwardly toward the opening 47 in the frusto conical bottom 48 of the cage. After the abutment 16 has left the lug 17, it will pass from the pulleys 6 to 7 at right angles to the path of travel of the platform, turning at the pulley 7, it will come in contact with the lug 18, when it will start the platform in the opposite direction until it reaches the pulley 8, when it will turn and travel at right angles to the pulley 9, where it will again turn and meet the lug 17 and start the platform back again. Thus it will be seen that as the platform moves back and forth under the cage, the trays are alternately operated, first as bait for enticing flies thereon and then as a disturber. The platform and trays will remain stationary for a short space of time at the limit of its movement in either direction or while the abutment 16 travels from one lug to the other. During this space of time, one tray is delivering its catch within the housing while the other tray is outside the housing free to entice the flies. When it is desired, the cage 30 may be removed from the housing for the purpose of emptying and cleaning.

What I claim is:

1. A fly trap comprising a cage, a platform provided with a bait tray, means for reciprocating the platform to bring the tray beneath and away from the cage, and means for rocking the tray when under the cage.

2. A fly trap comprising a cage, a platform provided with bait trays, means for rocking the trays when under the cage, and means for reciprocating the platform to alternately bring the trays beneath the cage.

3. A fly trap comprising a housing having passages therethrough, gates for said passages, a cage mounted on said housing, a platform, means for reciprocating the platform into and out of said housing and means carried by the platform for operating said gates.

4. A fly trap comprising a housing having passages therethrough, vertically sliding gates for said passages, a cage mounted on said housing, a platform, means for reciprocating the platform into and out of said housing and means carried by the platform for operating said gates.

5. A fly trap comprising a housing having passages therethrough, gates for said passages, a cage mounted on said housing, a platform provided with bait trays, means for reciprocating the platform to alternately bring the trays into said housing, and means carried by the platform for operating said gates and rocking said trays.

6. A fly trap comprising a housing having passages therethrough, gates for said passages, a cage mounted on said housing, a platform provided with bait trays pivoted thereon, means for reciprocating the platform to alternately bring the trays into said housing, and means carried by the platform for operating said gates and rocking said trays.

7. A fly trap comprising a housing having passages therethrough, gates for said passages, a cage mounted on said housing, a platform provided with bait trays pivoted thereon, means for reciprocating the platform to alternately bring the trays into said housing, and a cam carried by the platform for vertically operating said gates and rocking said trays.

8. A fly trap comprising a housing having passages therethrough, gates for said passages, a cage mounted on said housing, a platform provided with bait trays pivoted thereon having tongues extending into the path of said gates, means for reciprocating said platform to alternately bring the trays into said housing, and a cam carried by said platform for vertically operating said gates and rocking said trays.

9. A fly trap comprising a housing having passages therethrough, gates for said passages, a cage mounted on said housing, a platform provided with bait trays pivoted thereon, said trays having tongues extending into the path of said gates, flaps pivoted to said gates and adapted to engage said tongues for rocking said trays, means for reciprocating said platform to alternately bring the trays into said housing and a cam carried by said platform for engaging said flaps for vertically operating said gates.

10. A fly trap comprising a housing having passages therethrough, gates for said passages, a cage mounted on said housing, a platform provided with bait trays pivoted thereon, said trays having tongues extending into the path of said gates, weighted flaps pivoted to said gates and adapted to engage said tongues for rocking said trays, means for reciprocating said platform to alternately bring the trays into said housing and a cam carried by said platform for engaging said flaps for vertically operating said gates.

11. A fly trap comprising a housing having passages therethrough, gates for said passages, a cage mounted on said housing, a platform provided with bait trays pivoted thereon, said trays having a moving means located in the tray and tongues extending into the path of said gates, means for reciprocating said platform to alternately bring the trays into said housing and a cam carried by said platform for vertically operating said gates and rocking said trays.

12. A fly trap comprising a housing having passages therethrough, gates for said passages, a cage mounted on said housing, a platform provided with bait trays pivoted thereon, said trays having a gravity moving means located in the tray and tongues extending into the path of said gates, means for reciprocating said platform to alternately bring the trays into said housing and a cam carried by said platform for vertically operating said gates and rocking said trays.

13. A fly trap comprising a housing having passages therethrough, gates for said passages, a cage mounted on said housing, a platform provided with bait trays pivoted thereon, said trays having channels therein for the reception of balls, and tongues extending into the path of said gates, means for reciprocating said platform to alternately bring the trays into said housing and a cam carried by said platform for vertically operating said gates and rocking said trays.

In testimony that I claim the foregoing as my invention, I have signed my name, in presence of two witnesses, this 9th day of February, 1915.

STEPHEN KELTONIK.

Witnesses:
C. W. MOSHOLDER,
WESLEY M. ROLNER.

Copies of this patent may be obtained for five cents each, by addressing the "Commissioner of Patents, Washington, D. C."